United States Patent
Lai et al.

(10) Patent No.: US 7,254,043 B2
(45) Date of Patent: Aug. 7, 2007

(54) POWER CONVERTER FOR FUEL BATTERY

(75) Inventors: Jih-Sheng Lai, Taipei (TW);
Haun-Liung Chen, Taipei (TW); Kevin Wu, Taipei (TW)

(73) Assignee: Tatung Co., Ltd. (TW)

( * ) Notice: Subject to any disclaimer, the term of this patent is extended or adjusted under 35 U.S.C. 154(b) by 107 days.

(21) Appl. No.: 11/156,520

(22) Filed: Jun. 21, 2005

(65) Prior Publication Data
US 2006/0083030 A1  Apr. 20, 2006

(30) Foreign Application Priority Data
Oct. 18, 2004  (TW) ............................... 93131513 A

(51) Int. Cl.
*H02M 3/335* (2006.01)
(52) U.S. Cl. .......................................... 363/16; 363/98
(58) Field of Classification Search .................. 363/16, 363/17, 95, 97, 98, 131, 132
See application file for complete search history.

(56) References Cited

U.S. PATENT DOCUMENTS

| | | | | |
|---|---|---|---|---|
| 5,828,558 A | * | 10/1998 | Korcharz et al. ............. | 363/20 |
| 6,177,787 B1 | * | 1/2001 | Hobrecht .................... | 323/283 |
| 6,278,263 B1 | * | 8/2001 | Walters et al. .............. | 323/272 |
| 6,819,577 B1 | * | 11/2004 | Wiktor et al. ................ | 363/72 |
| 6,911,809 B2 | * | 6/2005 | Kernahan .................... | 323/283 |

* cited by examiner

*Primary Examiner*—Adolf Berhane
(74) *Attorney, Agent, or Firm*—Bacon & Thomas, PLLC

(57) ABSTRACT

The present invention relates to a power converter, using input voltage provided by a fuel battery and processing an electrical characteristics transformation on the input voltage to output an output voltage to loading. The power converter comprises: a multiple-phase PWM controller to output multiple PWM control signals in accordance with the voltage level of output voltage; a multiple phase bridge converter to input and output the input voltage in accordance with the multiple PWM control signals; and a transformer to input and process an electrical characteristics transformation on the input voltage from the multiple phase bridge converters to output the output voltage. The multiple-phase PWM controller further comprises a PWM generator and at least one phase shifter.

6 Claims, 4 Drawing Sheets

US 7,254,043 B2

POWER CONVERTER FOR FUEL BATTERY

BACKGROUND OF THE INVENTION

1. Field of the Invention

The present invention relates to a power converter for a fuel battery.

2. Description of Related Art

A fuel battery is a type of new power supply that is of high efficiency and low pollution. The fuel battery can supply 48V and over 100 A power to a loading. When using the fuel battery as the power supply, it requires a full-bridge inverter, a transformer and a rectifier between the fuel battery and the loading to process the transform of the electrical characteristics. As shown in FIG. 1, the conventional power converter 10 that can provide electrical transform of 5 KW comprises a full-bridge inverter 12, a transformer 16, and a rectifier 18. Moreover, the full-bridge inverter 12, the transformer 16, and the rectifier 18 are connected in sequence to form the power converter 10. The power converter 10 can process the transform of electrical characteristics of the power from the fuel battery 20. For example, it can convert the 48V direct current into 400V direct current to provide the power consumption of loading 30.

Due to the power transistor 13 of the full-bridge inverter 12 not being able to pass a peak drain current over 70 A, every switching circuit 14 adopts two parallel power transistors 13 to reduce or balance the drain current that every power transistor 13 needs to pass. The two parallel power transistors 13 also alternatively enable/disable the switching circuit 14 to provide the power transistors 13 sufficient time for radiating the heat to avoid the depreciation of the full-bridge inverter 12 due to excessive heat.

However, the conventional power converter 10 has the following defects: the volumes of a filtering capacitor C1 of the full-bridge inverter 12, power transistors 13, transformer 16, filtering inductance L1 and filtering capacitor C2 of the rectifier 18 are all non-reducible which will cause the limitation of the application of the power converter 10.

Therefore, it is desirable to provide a power converter for a fuel battery to alleviate or mitigate the aforementioned problem.

SUMMARY OF THE INVENTION

To avoid the defect of the conventional power converter, the present invention discloses a power converter that can be used in a fuel battery. The power converter comprises: a phase PWM controller to output a plurality of PWM control signals in accordance with the voltage level of the output voltage; a bridge converter to input and output the input voltage in accordance of the PWM control signals; and a transformer to input and perform an electrical characteristics transformation on the input voltage from the bridge converter to output the output voltage. The phase PWM controller further comprises a PWM generator and at least one phase shifter.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
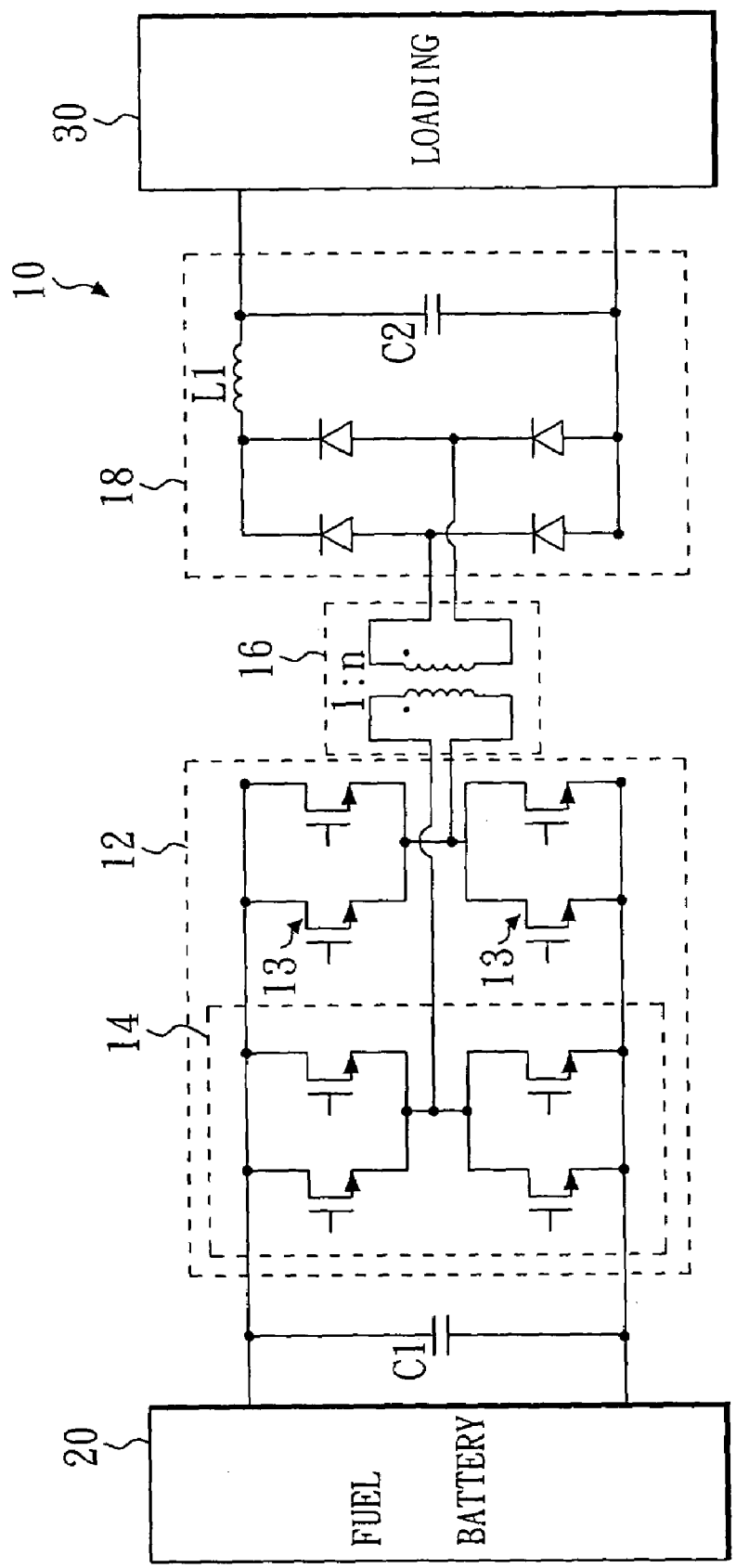
FIG. 1 is a diagram of the conventional power converter.
Figure 2:
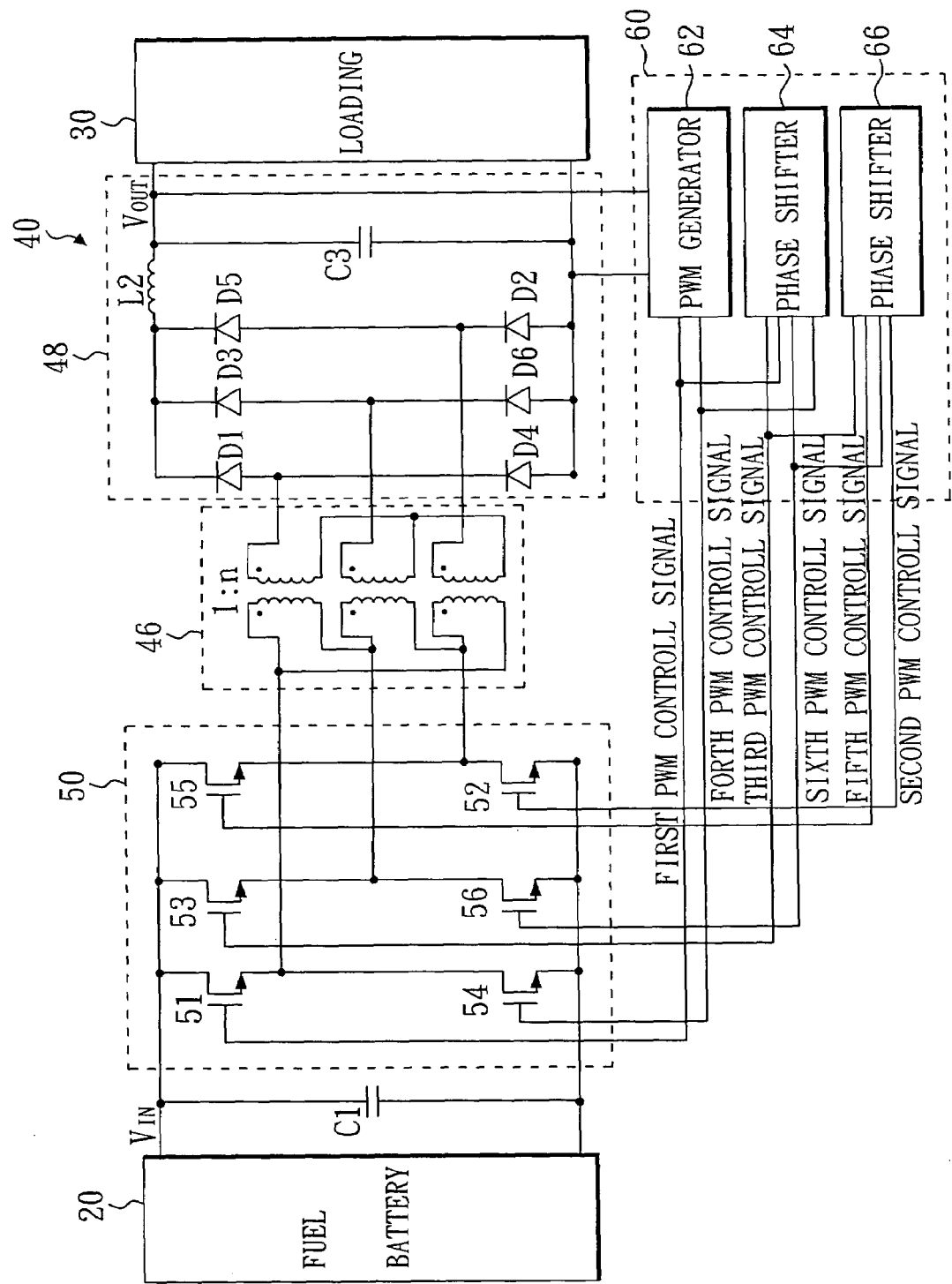
FIG. 2 is a block diagram of the present invention of a three-phase power converter.

As shown in FIG. 2, the power converter of the present invention employs a multiple-phase PWM control to process the transformation of electrical characteristics, making the power from the fuel battery 20 able to be outputted to a loading 30 so as to satisfy the consumption of the loading 30. It also serves the advantages of high-efficiency and small volume. The power converter is preferably a three-phase power converter which is further explained in the following.

As shown in FIG. 2, the present invention of a power converter 40 is connected to the fuel battery 20 and the loading 30, inputting the input voltage Vin from the fuel battery 20 and then processing the electrical characteristics transformation on the input voltage Vin. The input voltage Vin of high current and low voltage is transformed into an output voltage Vout of low current and high voltage. The output voltage Vout is then outputted to the loading 30. The power converter 40 comprises the following elements:

A three-phase PWM controller 60 is used to detect the voltage level of the output voltage Vout and then output six PWM control signals, wherein each PWM control signal is adopted to turn on/off an appropriate power transistor. The three-phase PWM controller 60 comprises a PWM generator 62, a phase shifter 64, and a phase shifter 66. The PWM generator 62 outputs the first PWM control signal and the fourth PWM control signal to gate terminals of a power transistor 51 and a power transistor 54 respectively of a three-phase bridge converter 50 in accordance with the voltage level of the output-voltage Vout. The power transistor 51 and power transistor 54 can be turned on or off according to the first PWM control signal and the fourth PWM control signal, respectively. Moreover, the on/off condition of the power transistor 51 is opposite to the power transistor 54. The phase shifter 64, inputting the first PWM control signal and the fourth PWM control signal and then performing a phase shifting process which is the best to delay 120 degrees of phase, outputs the third PWM control signal and the sixth PWM control signal to the gate terminals of power transistor 54 and the power transistor 56 respectively to turn on/off the power transistor 53 and the power transistor 56. The phase shifter 66, inputting the third PWM control signal and then performing a phase shifting process which is the best to delay 120 degrees of phase, outputs the fifth PWM control signal and the second PWM control signal to the gate terminals of power transistor 55 and the power transistor 52 respectively to turn on/off the power transistor 55 and the power transistor 52. The phase shifters 64 and 66 are preferably dual FIFO elements produced by Texas Instruments with product number SN74AACT2226. Via the adjustment of the PWM generator 62 and the clock frequency of the phase shifters 64 and 66, the phase shifters 64 and 66 provide a function of a phase delay of 120 degrees. When the loading 30 changes, the waves of the first PWM control signal and the fourth PWM control signal will be modified based on the level of the new loading. Moreover, the waves of the third PWM control signal, together with those of the sixth PWM control signal and the fifth PWM control signal, together with those of the second PWM control signal will be the same with those of the first PWM control signal and the fourth PWM control signal respectively, and the only difference is the phase difference. Therefore, the three-phase PWM controller 60 can accurately control the operation of the three-phase bridge converter 50.

The three-phase bridge converter 50, according to the six PWM control signals from the three-phase PWM controller 60, outputs the input voltage Vin to the transformer 46. The six PWM control signals are employed to turn on/off the power transistors 51, 52, 53, 54, 55 and 56. Among these, the power transistor 51 is in series connection with the power transistor 54, whereas the power transistor 53 is in series connection with the power transistor 56, and the power transistor 55 is in series connection with the power transistor 52. Each power transistor, according to the voltage level of the gate terminal, can be turned on/off. For example, when the voltage level is high voltage, the power transistor can be turned on. When the voltage level is low, the power transistor can be turned off.

The transformer 46 transforms the electrical characteristics of the input voltage Vin, using the three-phase bridge converter 50, to output the output voltage Vout to the rectifier 48.

The rectifier performs a rectification process on the output-voltage Vout, and it includes six diodes, a filtering inductance L2 and a filtering capacitor C3.

Figure 3:
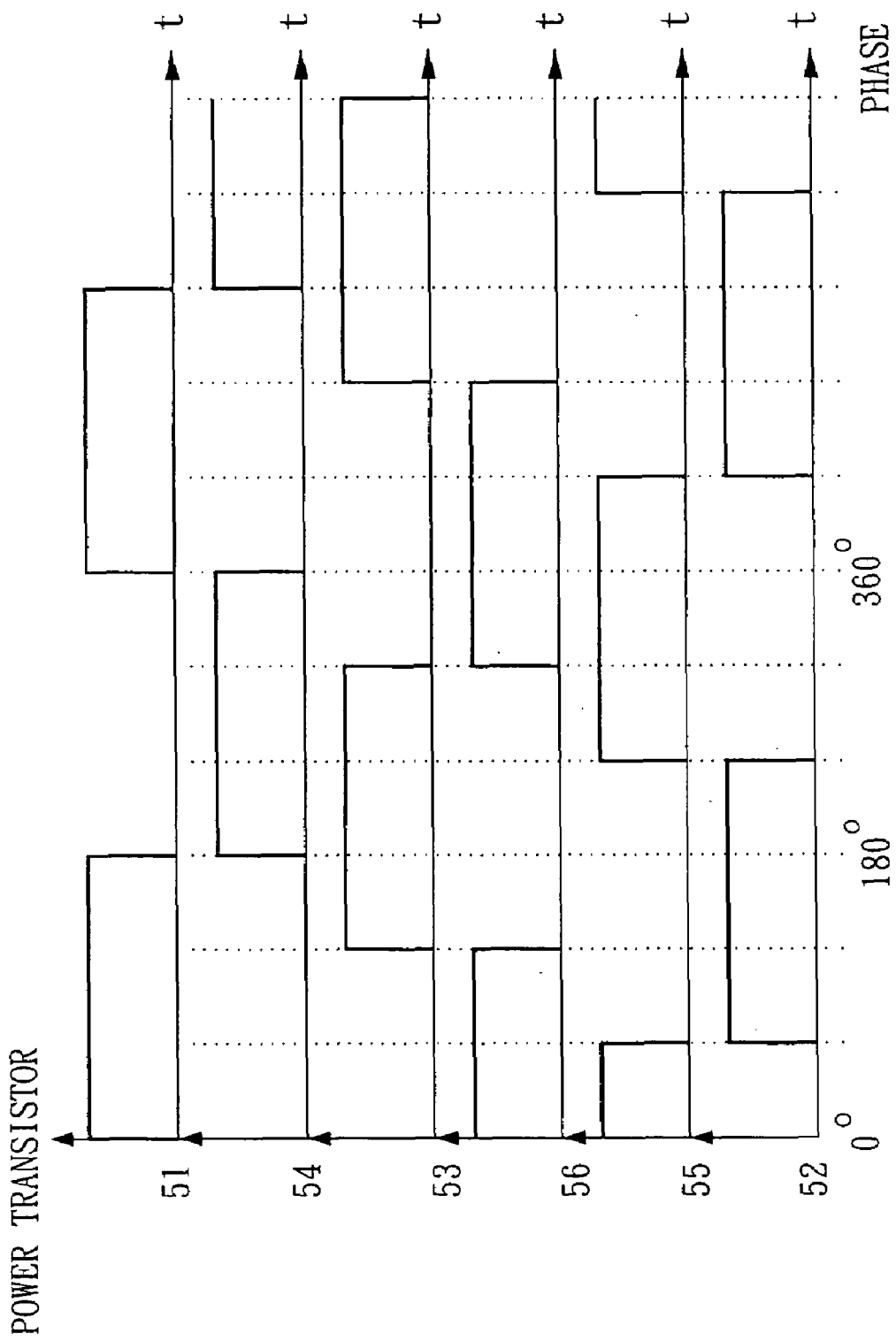
FIG. 3 is a phase diagram of the six PWM control signals in heavy-load condition.
Figure 4:
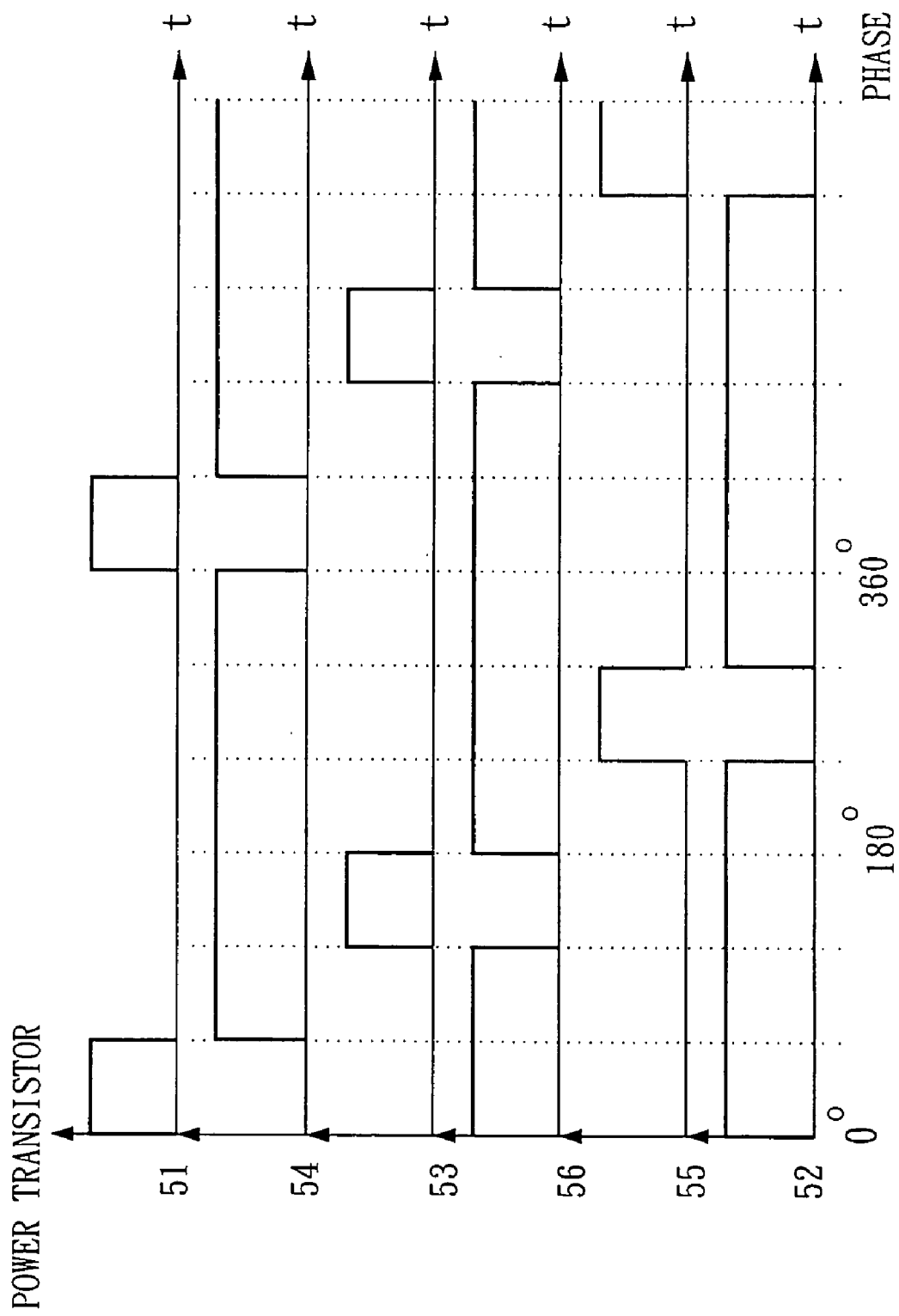
FIG. 4 is a phase diagram of the six PWM control signals in light-load condition.

As shown in FIG. 3, when the loading 30 consumes a lot of power, the turned on time of the power transistors 51, 53, and 55 would be increased, allowing the transformer 46 to provide sufficient power to the loading 30. As shown in FIG. 4, when the loading 30 consumes less power, the turned on time of the power transistors 51, 53, and 55 is reduced, allowing the transformer 46 to provide adequate power to the loading 30. Due to the power transistors 51, 52, 53, 54, 55 and 56 taking turns to switch on or off, and the switching speed of the power transistor is faster than that of conventional power transistor 13, the current ripple will be reduced significantly, making the output voltage Vout of the transformer 46 have a smaller current ripple. Due to the current ripple of the output-voltage Vout being significantly lower than that of the conventional power converter, the user can select smaller volumes of the filtering inductance L2 and filtering capacitor C3 than the conventional filtering inductance L1 and filtering capacitor C2. It further obviously has the advantage of reduced power waste, providing effective power transform, and low cost.

From the above description, the present invention of multi phase power converter can reduce the current ripple to reduce the volumes of filtering inductance L2 and the filtering capacitor C3, and can also reduce the volume of the filtering capacitor C1.

Although the present invention has been explained in relation to its preferred embodiment, it is to be understood that many other possible modifications and variations can be made without departing from the spirit and scope of the invention as hereinafter claimed.

What is claimed is:

1. A power converter for inputting and performing an electrical characteristics transformation on an input voltage from a fuel battery to output an output voltage to a loading, comprising:

a multiple-phase PWM controller to output a plurality of PWM control signals in accordance with the voltage level of the output voltage;

a bridge converter to input and output the input voltage in accordance of the PWM control signals; and a transformer to input and perform an electrical characteristics transformation on the input voltage from the bridge converter to output the output voltage;

wherein the phase PWM controller further comprises a PWM generator and at least one phase shifter; and wherein the PWM generator outputs a first PWM control signal and a fourth PWM control signal based on the voltage level of the output voltage, and the at least one phase shifter outputs a third PWM control signal, a sixth PWM control signal, a fifth PWM control signal, and a second PWM control signal respectively in accordance with the first PWM control signal or the fourth PWM control signal.

2. The power converter as claimed in claim 1, wherein the power converter further comprises a rectifier for inputting the output voltage and outputting a rectified output voltage to the loading.

3. The power converter as claimed in claim 1, wherein the at least one phase shifter is a FIFO element.

4. A power converter for inputting and performing an electrical characteristics transformation on an input voltage from a fuel battery to output an output voltage to a loading, comprising:

a multiple-phase PWM controller to output a plurality of PWM control signals in accordance with the voltage level of the output voltage;

a bridge converter to input and output the input voltage in accordance of the PWM control signals; and a transformer to input and perform an electrical characteristics transformation on the input voltage from the bridge converter to output the output voltage;

wherein the phase PWM controller further comprises a PWM generator and at least one phase shifter; and wherein the phase of the third PWM control signal delays 120 degrees from the phase of the first PWM control signal, the phase of the fifth PWM control signal delays 120 degrees from the phase of the third PWM control signal, the phase of the sixth PWM control signal delays 120 degrees from the phase of the fourth PWM control signal, and the phase of the second PWM control signal delays 120 degrees from the phase of the sixth PWM control signal.

5. The power converter as claimed in claim 4, wherein the power converter further comprises a rectifier for inputting the output voltage and outputting a rectified output voltage to the loading.

6. The power converter as claimed in claim 4, wherein the at least one phase shifter is a FIFO element.

* * * * *